(No Model.)

W. H. FARRELL.
LUBRICATOR.

No. 385,605. Patented July 3, 1888.

Witnesses:
Alex. Barkoff.
Edw. M. Riley.

Inventor:
Wm. H. Farrell,
by his Attorneys.
Howson & Howson.

UNITED STATES PATENT OFFICE.

WILLIAM H. FARRELL, OF SOUTH BETHLEHEM, PENNSYLVANIA.

LUBRICATOR.

SPECIFICATION forming part of Letters Patent No. 385,605, dated July 3, 1888.

Application filed March 19, 1888. Serial No. 267,742. (No model.)

*To all whom it may concern:*

Be it known that I, WILLIAM H. FARRELL, a citizen of the United States, and a resident of South Bethlehem, Northampton county, Pennsylvania, have invented certain Improvements in Grease-Cups or Lubricators, of which the following is a specification.

My invention relates to that class of lubricators in which the lubricant used is a grease of a solid or semi-solid character, and in which a weighted or spring-actuated plunger is employed to force the lubricant from the cup to the bearing or other surface upon which it is to be used, the object of my invention being to permit the elevation of the plunger without drawing the lubricant from the bearing back into the cup. This object I attain in the manner which I will now proceed to describe, reference being had to the accompanying drawings, in which—

Figure 1:
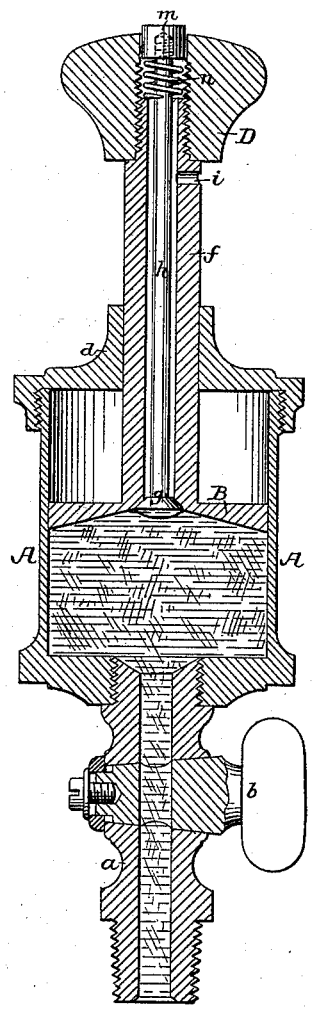
Figure 2:
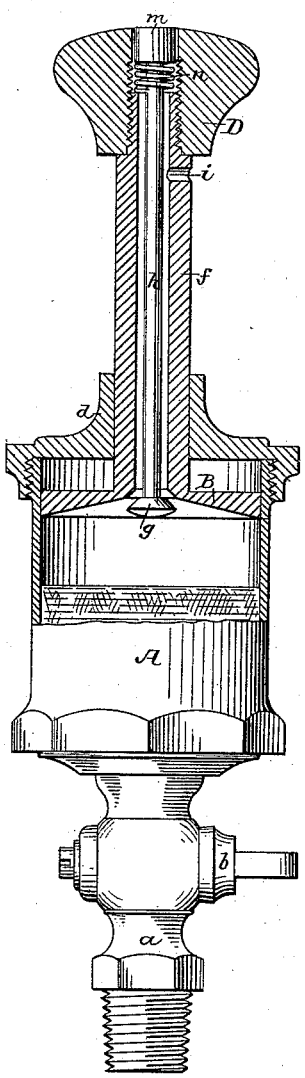

Figure 1 is a transverse section of a grease-cup or lubricator constructed in accordance with my invention; and Fig. 2 is a transverse section, partly in elevation, showing some of the parts in a different position from that illustrated in Fig. 1.

A is the cup or vessel for containing the lubricant, this cup having a stem, $a$, which is threaded at the lower end for adaptation to the bearing or other object to be lubricated, and is provided with a cut-off valve, $b$.

The grease or other lubricant is pressed from the cup by means of a plunger, B, the stem of which passes through a guide-opening in the cap $d$ of the cup, and is provided at the upper end with a weight, D, or it may be acted upon by a spring in order to impart sufficient pressure to the grease to drive it out through the stem $a$ to the bearing or other object to be lubricated.

The plunger B is dished or concaved on the under side, so that as it is forced down into the cup it has a tendency to drive the grease toward the center of the cup, and thus insure the effective discharge of the same without the use of an excessively heavy weight or a very strong spring. The stem $f$ of the plunger is hollow, and at the bottom of said stem is formed a seat for a valve, $g$, the stem $h$ of which passes up through the central opening of the stem $f$, and has at the upper end a knob or button, $m$, which is acted upon by a spring, $n$, tending to elevate it, and thus maintain the valve $g$ in contact with its seat. By pressing upon the knob or button, however, the valve is forced away from its seat, and this operation is resorted to when it becomes necessary to raise the plunger for any purpose, so that air may freely enter the space between the plunger and the lubricant, said air finding its way into the hollow stem $f$ through an opening, $i$, and thence passing down through said hollow stem to the space beneath the plunger. By this means the elevation of the plunger can be effected without forming a partial vacuum in the cup A and causing the flow of the lubricant from the bearing back into the cup.

Having thus described my invention, I claim and desire to secure by Letters Patent—

1. The combination of the lubricating vessel or cup having a discharge-stem at the bottom, a plunger pressing upon said lubricant, and a spring-actuated valve carried by said plunger and controlling the admission of air to the space beneath the plunger, all substantially as specified.

2. The combination of the lubricating vessel or cup having a discharge stem at the bottom, the plunger having a hollow stem, the valve adapted to a seat upon the bottom of the plunger and having a stem contained within said plunger, a cap or button at the upper end of said stem, and a spring tending to raise the stem and close the valve, all substantially as specified.

In testimony whereof I have signed my name to this specification in the presence of two subscribing witnesses.

WM. H. FARRELL.

Witnesses:
ROBERT P. ROSS,
W. M. WENDELL.